United States Patent [19]

Yaniv et al.

[11] Patent Number: 4,929,569
[45] Date of Patent: May 29, 1990

[54] METHOD OF FABRICATING AMORPHOUS SILICAN DIODE ADDRESSED LIQUID CRYSTAL DISPLAY

[75] Inventors: Zvi Yaniv, Southfield; Vincent D. Cannella, Birmingham, both of Mich.; Gregory L. Hansell, Camarillo, Calif.; Louis D. Swartz, Holly, Mich.

[73] Assignee: Ovonic Imaging Systems, Inc., Troy, Mich.

[21] Appl. No.: 247,815

[22] Filed: Sep. 22, 1988

Related U.S. Application Data

[63] Continuation of Ser. No. 82,266, Aug. 6, 1987, abandoned, which is a continuation of Ser. No. 675,941, Dec. 3, 1984, abandoned, which is a continuation-in-part of Ser. No. 573,004, Jan. 23, 1984, abandoned.

[51] Int. Cl.[5] .................... H01L 45/00; H01L 27/06
[52] U.S. Cl. .......................................... 437/51; 437/3; 357/2; 350/332
[58] Field of Search ............... 437/3, 51; 148/DIG. 1; 357/2; 350/332, 333, 334

[56] References Cited

U.S. PATENT DOCUMENTS 4,604,636  8/1986  Dalal ........................................ 357/2
4,630,893  12/1986  Credelle et al. ......................... 357/2

FOREIGN PATENT DOCUMENTS

0070598  1/1983  European Pat. Off. .
0073705  3/1983  European Pat. Off. .
2518788  6/1983  France .

Primary Examiner—Brian E. Hearn
Assistant Examiner—Tuan Nguyen
Attorney, Agent, or Firm—Marvin S. Siskind; Richard M. Goldman; Kenneth M. Massaroni

[57] ABSTRACT

There are disclosed liquid crystal displays each having at least one pixel element formed on an insulative substrate including at least two conductive electrodes and liquid crystal display material disposed between the electrodes. The pixel elements further include at least a pair of isolation devices formed from a deposited semiconductor material which facilitates selective excitation of the pixel elements and applied potential reversal across the electrodes during alternate display frames. The isolation devices can include a plurality of series connected diodes. The isolation devices can be formed as diode rings. A method of making the displays is also disclosed.

19 Claims, 4 Drawing Sheets

METHOD OF FABRICATING AMORPHOUS SILICAN DIODE ADDRESSED LIQUID CRYSTAL DISPLAY

RELATED APPLICATION

This application is a continuation of application Ser. No. 082,266filed on Aug. 6, 1987, which is a continuation of application Ser. No. 675,941 filed Dec. 3, 1984 which is a continuation-in-part of application Ser. No. 573,004 filed Jan. 23, 1984, all abandoned.

FIELD OF THE INVENTION

The present invention relates generally to displays and more particularly to displays which are driven by diodes formed from deposited semiconductor materials.

BACKGROUND

There are many applications wherein liquid crystal displays are utilized to advantage. For example, liquid crystal displays find use in digital watches, digital clocks, calculators, pocket-sized television receivers, and various forms of portable games, to name just a few.

Liquid crystal displays generally include a plurality of pixels (picture elements) arranged in rows and columns. Each pixel includes a pair of electrodes. As is well known, when a voltage is applied across the electrodes, the optical properties of the liquid crystal material can be changed to provide a light or dark display depending upon the type of liquid crystal material used and the desired mode of operation of the display.

To obtain a usable display, the voltage potential across the electrodes of each pixel must be selectively applied. In the prior art, the selective application of these voltage potentials has been accomplished through the use of thin film transistors. While thin film transistors are generally successful in these applications, they can only be used for small area liquid crystal displays. Conventional thin film transistors also exhibit relatively high power dissipation and low frequency operation. This limits the number of pixels which can be driven in a liquid crystal display which in turn limits the liquid crystal display areas.

Another problem in using thin film transistors in liquid crystal displays is yield. Virtually one-hundred percent of all of the thin film transistors must be operational to obtain a usable display. Such yields are difficult to achieve over small display areas and virtually impossible to achieve for large area displays because the making of thin film transistors requires numerous process steps, many of which require extremely accurate photolithography. Accurate or precise photolithography is required to control important physical device dimensions, principal among them being the source to drain spacing which determines, in conventional planar thin film transistors, the length of the current conduction channel between the source and drain. The channel length dramatically effects both the device current and operating frequency limit. As a result, the high yields required cannot be readily achieved for large display areas with conventional photolithography techniques.

The present invention overcomes such deficiencies exhibited by thin film transistors by using diodes to drive the display pixels. Furthermore, the diodes can be formed without the need of precise photolithography and in fewer process steps than that required to form thin film transistors.

The use of diodes to drive displays has been previously proposed. However, previously proposed diode driven displays were limited to discrete diode devices which of course are not appropriate for large area displays employing potentially thousands of pixels. Such displays would be necessarily and unduly complicated both physically to implement and electrically to address the individual pixels.

The present invention overcomes these problems by forming the diodes integrally with the display structure. The diodes can be formed from deposited semiconductor materials by processes not incompatible with tho other display processes.

SUMMARY OF THE INVENTION

The present invention provides a display incorporating a light influencing material and a subassembly for use in such a display. The subassembly includes a substrate, a pixel electrode of a selected shape formed on the substrate, a first address line formed on the substrate, a second address line insulated from the first address line and carried by the substrate, a first isolation means formed on a region of the first address line and coupled between the first address line and the pixel electrode and a second isolation means formed on a region of the pixel electrode and coupled between the pixel electrode and the second address line. Each isolation means can include a single diode or alternately a plurality of vertically arrayed series coupled diodes.

The present invention also provides for a display incorporating a light influencing material having an insulated substrate, a first pixel electrode formed on the substrate, a first address line formed on the substrate, a first isolation device formed on the first address line, a second isolation device formed on the pixel electrode, a second address line insulated from the first address line and in electrical connection with the second isolation device, a conductive material coupling the first isolation device to the first pixel electrode, a second pixel electrode spaced apart from and substantially parallel to the first pixel electrode and the light influencing material disposed between at least the pixel electrodes. Each isolation device can include a single diode or alternately a plurality of vertically arrayed series coupled diodes. The isolation devices may be formed as a diode ring.

A subassembly for a display pixel is also provided by the present invention. The subassembly includes a substrate, a pixel electrode formed thereon, an address line formed adjacent the pixel electrode, and first and second isolation structures formed on the address line and the pixel electrode respectively. A deposited layer of metal connects the first isolation structure to the pixel electrode. A second layer of metal connects the second isolation structure to a second address line.

In accordance with the present invention, the isolation devices of the subassembly and the display can be diodes formed from an amorphous silicon alloy. The alloy may contain hydrogen and/or fluorine.

The invention also provides for a method of making a subassembly for a display having at least one pixel and a pair of isolation devices. The method includes the steps of providing a substrate, depositing a conductive layer over the substrate, depositing a first metal layer over the conducting material, depositing a first doped semiconductor layer over the first metal layer, depositing a substantially intrinsic semiconductor layer over the first doped layer, depositing a second doped semiconductor layer over the intrinsic layer; the second doped layer is opposite in conductivity with respect to the first doped layer, and depositing a second metal layer over the second doped semiconductor layer. The method further provides for removing portions of the second metal layer so as to leave discrete regions thereof to define the locations of isolation devices, removing portions of the semiconductor layers while using the discrete metal regions as masks to form the isolation devices, removing portions of the first metal layer to form an address line with one of the isolation devices formed thereon, removing portions of the conductive material to form a first pixel electrode with the other isolation device positioned thereon, coupling the first isolation device to the pixel electrode, forming a second address line insulated from the first address line and coupled to the other isolation device. The method also provides for forming a second pixel electrode spaced apart from and substantially parallel to the first pixel electrode and applying light influencing material between the pixel electrodes.

The method also provides for carrying out the steps of depositing the layers of semiconductor material in a partial vacuum such that the partial vacuum is continuously maintained during the deposition of the layers of semiconductor material. The method also provides for forming the pixel electrodes of a transparent conducting material such as indium tin oxide.

The method also provides for forming a plurality of vertically arrayed isolation devices out of a plurality of deposited amorphous semiconductor alloy layers. The plurality of vertically overlying p-i-n amorphous silicon alloy layers can be etched so as to form first and second vertically arrayed, series coupled, stacks of isolation diodes. A series coupled stack of amorphous silicon alloy isolation devices will support a greater reverse bias voltage than will a single isolation device.

The method also provides for forming a diode ring coupled between an address line and a pixel electrode out of a plurality of deposited amorphous semiconductor alloy layers. The diode ring can include parallel coupled isolation devices each of which can be formed from one or more series coupled amorphous silicon alloy diodes. The isolation devices are parallel coupled with reverse polarity to form the ring. The method provides for forming the first and second isolation devices on the address line and on a region of the pixel electrode respectively, offset with respect to one another. The method also provides for depositing first and second metal layers to couple the first isolation device formed on the address line, to the pixel electrode and to couple the second isolation device, formed on the pixel electrode, to the address line.

The invention also provides for a subassembly for a display having an insulative substrate, conducting electrode formed thereon and first and second nonintersecting deposited address lines coupled to the electrode. The address lines are formed essentially parallel to one another.

The light influencing material can be a liquid crystal display material including conventional nematic liquid crystal display materials.

DESCRIPTION OF THE DRAWINGS

FIG. 17 is a cross-sectional side view illustrating in part another method in accordance with the present invention;

FIG. 18 is a schematic circuit diagram of the liquid crystal display pixel of FIG. 16;

FIG. 19 is a schematic circuit diagram illustrating the equivalent circuit of another embodiment of a liquid crystal display pixel embodying the present invention;

FIG. 20 is a cross-sectional side view illustrating one step in the method of making the liquid crystal display pixel illustrated schematically in FIG. 19;

FIG. 21 is a fragmentary top planar view of the liquid crystal display pixel illustrated in FIG. 19;

FIG. 22 is a cross-sectional side view of another step in the processing of the liquid crystal display pixel of FIGS. 19 and 21;

FIG. 23 is a cross-sectional side view of the liquid crystal display pixel of FIGS. 19 and 21.

DESCRIPTION OF THE PREFERRED EMBODIMENTS

Figure 1:
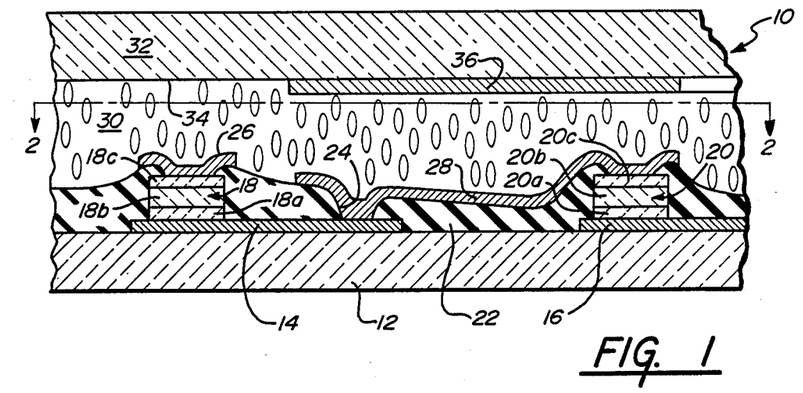
FIG. 1 is a cross-sectional side view of a liquid crystal display pixel.
Figure 2:
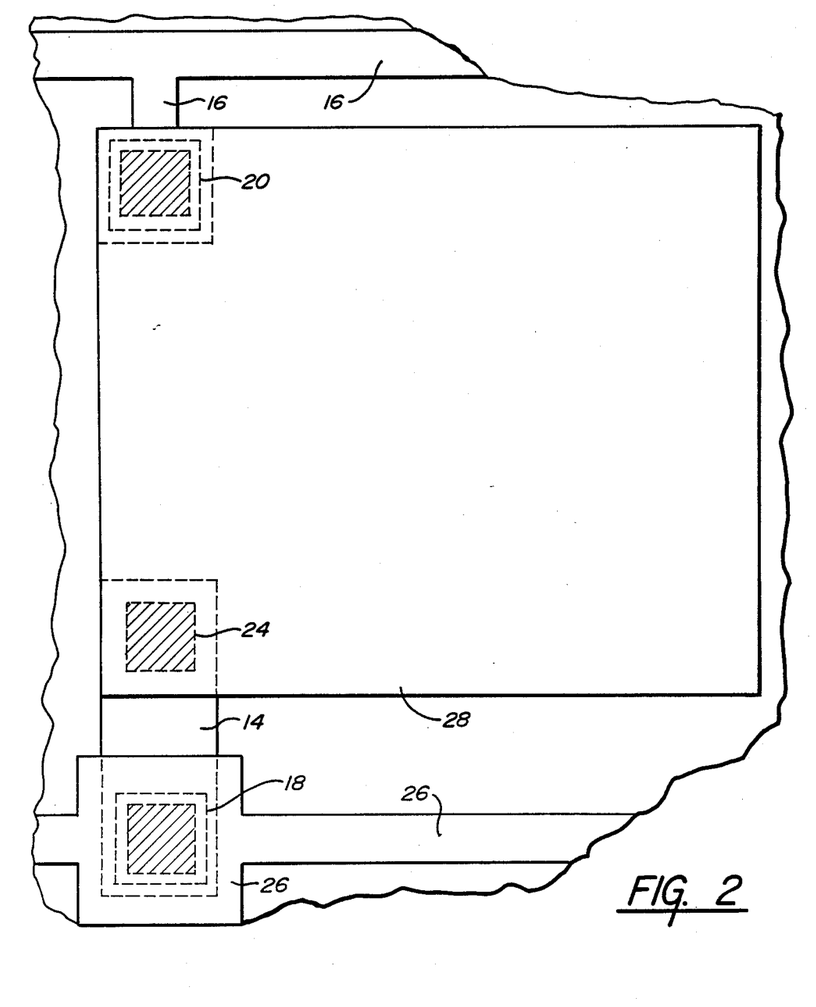
FIG. 2 is a top plan view as seen along lines 2—2 of FIG. 1.

Referring now to FIGS. 1 and 2, they illustrate a display pixel 10. Although just one pixel 10 is illustrated, it can be appreciated that many such pixels can be formed in, for example, a row and column arrangement to provide a complete liquid crystal display. It will be understood that none of the FIGS. are drawn to scale. It will also be understood the proportionate size of some of the electronic structures may be enlarged for the purpose of providing an enabling disclosure.

The pixel 10 includes an insulative substrate 12 which can be formed from glass, for example. Formed on the glass substrate 12 is an interconnect bus or lead 14 and a first address lead 16. The interconnect lead 14 and address lead 16 can be formed from a conductive material such as metal, for example, aluminum, molybdenum, or a molybdenum tantalum alloy. Other suitable metals are chromium, tantalum tungsten, palladium and platinum. The interconnect lead 14 and address lead 16 are formed by, for example, S-gun magnetron sputtering the metal over the entire surface area of the glass substrate 12 and then removing selected portions of the deposited metal by utilizing a mask and photolithography techniques of the type well known in the art.

The pixel 10 further includes a pair of diodes 18 and 20 formed on the interconnect lead 14 and address lead 16, respectively. The diodes 18 and 20 are preferably formed from a deposited semiconductor material. The deposited semiconductor material is preferably an amorphous semiconductor alloy including silicon. The amorphous silicon alloy can also include hydroGen and/or fluorine and can be deposited by plasma assisted chemical vapor deposition i.e. glow discharge as disclosed, for example, in U.S. Pat. No. 4,226,898 which issued on Oct. 7, 1980 in the names of Stanford R. Ovshinsky and Arun Madan for Amorphous Semiconductors Equivalent To Crystalline Semiconductors Produced By A Glow Discharge Process. The disclosure of the '898 Patent is hereby incorporated by reference. The diodes 18 and 20 preferably have a p-i-n configuration formed by a first doped region 18a and 20a, which can be p-type, an intrinsic region 18b and 20b overlying the first doped regions 18a and 20a respectively, and a second doped region 18c and 20c, which can be n-type, overlying the intrinsic regions 18b and 20b respectively.

The diodes 18 and 20 can be formed more specifically by depositing the previously mentioned amorphous silicon alloy regions over the entire surface area of the substrate 12 and leads 14 and 16 and thereafter selectively etching portions of the amorphous silicon alloy regions by utilizing a suitable mask and conventional photolithography techniques. The mask utilized during the etching process preferably defines a diode configuration wherein each diode is about 20to 50 microns on a side. Representative thicknesses for the amorphous silicon alloy regions can be, for example, 300 to 1,000 Angstroms and preferably 500 Angstroms for the p-type regions, 1,000 to 10,000 Angstroms and preferably 3,000Angstroms for the intrinsic regions, and 100 to 500 Angstroms and preferably 200 Angstroms for the n-type regions.

Formed over the interconnect lead 14, the substrate 12, and the address lead 16, and in between the diodes 18 and 20 is a layer of insulating material 22. The insulating material 22 can be formed from any deposited insulator such as silicon oxide ($Si_xO_y$) or silicon nitride ($Si_xN_y$), or a polyimide, for example. The insulating layer 22 defines an opening 24 which communicates with the interconnect lead 14. The configuration of the layer 22 can be obtained by roller, extrusion, or spin coating the polyimide, for example, over the entire surface area, spin coating a layer of photoresist over the polyimide layer, and then exposing and devoloping out both of the photoresist and the polyimide using a further mask. This step forms the opening 24 communicating with the interconnect lead 14 and uncovers upper surface portions of the p-type amorphous silicon alloy regions 18c and 20c of diodes 18 and 20.

The pixel 10 further includes a second address lead 26 in electrical contact with the n-type region 18c of diode 18 and a first electrode 28 which is an electrical connection with the interconnect lead 14 through the opening 24 and the n-type region 20c of diode 20. The first electrode 28 and the second address lead 26 can be formed from any of the metals previously referred to with respect to the interconnect lead 14 and first address lead 16 by sputtering the metal over the entire surface area of the polyimide 22, the exposed surface portions of the diodes 18 and 20, and the opening 24. The address lead 26 and the electrode 28 can then be configured by utilizing a suitable mask and conventional photolithography techniques.

The address leads 16, 26 are formed out of deposited metal essentially parallel to one another, as can be seen from FIG. 2, and both are coupled to the electrode 28. The diodes 18, 20 form an isolator coupled to the electrode 28. The isolator formed of the diodes 18, 20 has first and second inputs to which the address lines 26, 16 respectively are coupled.

Forming the address leads 16, 26 so that they do not cross is advantageous from a manufacturing perspective. When address lines cross a layer of insulator, such as silicon dioxide, must be positioned therebetween so as to isolate one address line from the other. Such insulator pads at times are formed with pinhole defects that result in the two address lines coming into electrical contact with one another. Elimination of these crossovers reduces the possibility of such defects. Additionally, elimination of these crossovers simplifies the overall structure of the display.

Speed of addressing is also enhanced by elimination of crossovers. Each crossover forms a capacitor with the insulator forming a dielectric between the adjacent regions of the respective address lines. Since a given array could have a plurality of crossover points, a substantial reduction in capacitance can result.

It must be appreciated that the structures illustrated in FIGS. 1 and 2 are not drawn to scale and that the electrode 28 defines the display area of the pixel 10. The electrode 28 can be configured in a square configuration as illustrated in FIG. 2 and can be, for example, 300 to 2,000 microns on a side depending on the overall size of the finished display matrix and the desired aspect ratio.

With the electrode 28 contacting the interconnect lead 14 through the opening 24, the diodes 18 and 20 are connected together in series relation As can also be noted in FIG. 1, the address leads 16 and 26 are only in electrical connection with electrode 28 through the diodes 18 and 20.

Overlying the resulting structure described above, is a layer of light influencing material 30. By the term "light influencing material" is meant any material which emits light or can be used to selectively vary the intensity, phase, or polarization of light either being reflected from or transmitted through the material. Liquid crystal material is only one such material having these characteristics. The light influencing material 30 can be of any conventional variety, as for example, nematic liquid crystal display material.

The pixel 10 is completed with a top transparent insulative plate 32 formed from, for example, glass On the inner surface 34 of the plate 32 is formed a layer of transparent conductive material 36 which can be, for example, indium tin oxide. The indium tin oxide layer 36 forms a second electrode of the pixel 10 which is in contact with the liquid crystal material 30. It is configured to have the same dimension as the electrode 28 and is aligned therewith. The top plate 32 is polarized in a manner well known in the art consistent with the type of liquid crystal display material 30 utilized in the pixel 10. An alignment coating of a conventional type can be applied over the electrode 28 for the purpose of aligning molecules in the liquid crystal display material 30.

Figure 3:
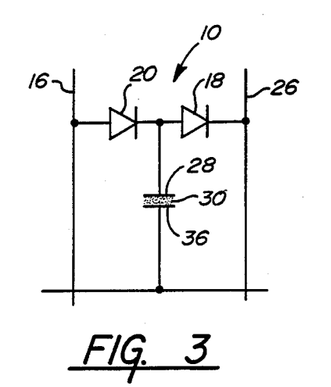
FIG. 3 is a schematic circuit diagram illustrating the equivalent circuit of the liquid crystal display pixel of FIG. 1.

Referring now to FIG. 3, it illustrates the equivalent circuit diagram of the pixel 10 of FIG. 1. As can be noted from FIG. 3, the pixel includes the address leads 16 and 26, a pair of series connected diodes 18 and 20 coupled between the address leads 16 and 26, and the first conductive electrode 28 coupled between the diodes. The pixel 10 further includes the second electrode 36 spaced from the first electrode 28. In between the electrodes 28 and 36 is the liquid display material 30.

As previously explained, the useful life of a nematic liquid crystal display can be extended if the polarity of the applied voltage potential is reversed during alternate frames. This can be accomplished with the pixel 10 of FIG. 1 by impressing a positive potential onto address lead 16 and a negative potential onto electrode 36 during one frame to forward bias diode 20 and by impressing a negative potential onto address lead 26 and a positive potential on the electrode 36 during the next frame. Repeating this sequence causes the potential applied to the liquid crystal display material to be reversed during alternate frames.

Figure 4:
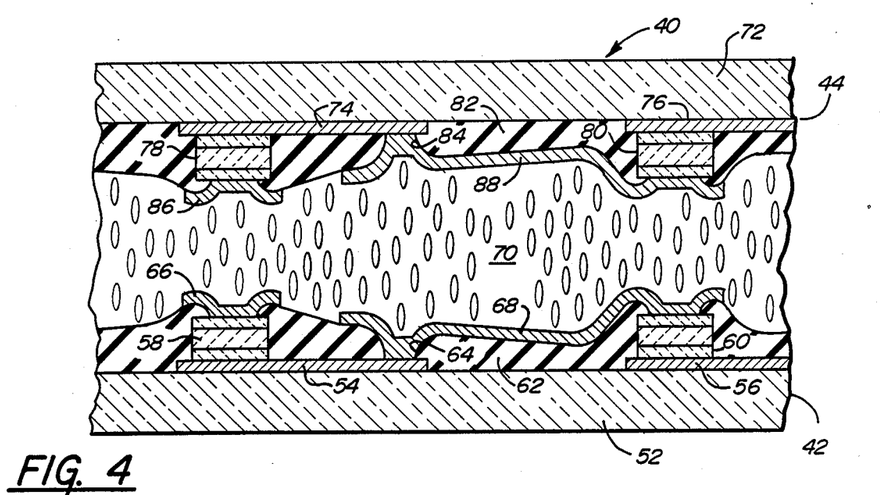
FIG. 4 is a cross-sectional side view of another liquid crystal display pixel.

Referring now to FIG. 4, it illustrates another liquid crystal display pixel 40 structured in accordance with another embodiment of the present invention. The pixel 40, as will be appreciated hereinafter, includes two pairs of diodes and is formed by first and second subassemblies 42 and 44 respectively.

Each of the subassemblies 42 and 44 are substantially identical to the portion of the liquid crystal display pixel 10 of FIG. 1 beneath the liquid crystal display material 30. Essentially, the second subassembly 44 is the mirror image of the first subassembly 42.

Like the pixel 10 of FIG. 1, the first subassembly 42 includes an insulative substrate 52 which can be formed from, for example, glass. The subassembly 42 further includes an interconnect lead 54, a first address lead 56, and a first pair of diodes 58 and 60 which can be substantially identical to the p-i-n diodes 18 and 20 of pixel 10. Between the diodes 58 and 60 and defining an opening 64 communicating with the interconnect lead 54 is a layer of insulative material 62 which can be a polyimide, for example. The subassembly 42 is completed with a second address lead 66 and a first electrode 68. The first subassembly 42 can be fabricated by the same method as described with respect to the pixel 10 of FIG. 1 and therefore need not be reiterated herein.

The procedure by which the first subassembly 42 is fabricated can be repeated to provide the second subassembly 44. To that end, as can be noted from the Figure, the subassembly 44 also includes an insulative substrate 72, an interconnect lead 74, a first address lead 76, a second pair of diodes 78 and 80, an insulating layer 82 defining an opening 84 communicating with interconnect lead 74, a second address lead 86, and a second electrode 88. If the liquid crystal display material 70 between the subassemblies 42 and 44 is to be viewed through the second subassembly 44, then the second electrode 88 should be formed from a transparent conductive material, such as, for example, indium tin oxide and the substrate 72 should be formed from a transparent material such as glass which is polarized in a manner consistent with the liquid crystal display material 70 utilized between the subassemblies. It will be understood that conventional molecular alignment coatings and polarizers will be incorporated into the subassemblies, such as 42 and 44, disclosed herein as would be known to those of skill in the art.

As was the case with the address lines 16, 26 the address lines 56, 66 and 76, 86 are formed with no crossovers. Each pair of address lines 56, 66 and 76, 86 is coupled to a respective electrode 68 or 88. The structure of FIG. 4 has the same advantages as does the previously discussed structure of FIGS. 1, 2 with respect to the noncrossing address lines.

Figure 5:
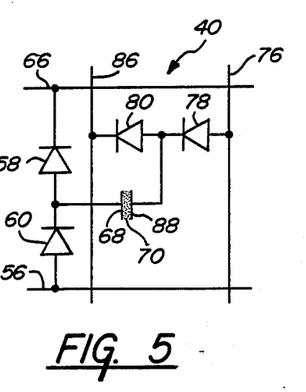
FIG. 5 is a schematic circuit diagram illustrating the equivalent circuit of the liquid crystal display pixel of FIG. 4.

Referring now to FIG. 5, it illustrates the equivalent circuit diagram of the pixel 40 of FIG. 4. As can be noted from the diagram, the pixel 40 includes a first pair of diodes 58 and 60 and a second pair of diodes 78 and 80. Each pair of diodes is coupled in series relation. The pixel 40 further includes a first pair of address leads 56 and 66 coupled to the respective ends of the series coupled diodes 58 and 60 and a second pair of address leads 76 and 86 coupled to respective ends of the other pair of series coupled diodes 78 and 80. The first electrode 68 is coupled to the junction of the diodes 58 and 60 and the second electrode 88 is coupled to the junction of the diodes 78 and 80. Lastly, liquid crystal display material 70 is disposed between the electrodes 68 and 88.

Like the pixel 10 of FIG. 1, the potential applied to the liquid crystal material 70 can be reversed during alternate frames. During one frame, a positive potential can be applied to address lead 76 and a negative potential to address lead 66. During alternate frames, a positive potential can be applied to address lead 56, and a negative potential to address lead 86. In this manner, the potential applied to the liquid crystal material 70 can be reversed during alternate frames.

Figure 6:
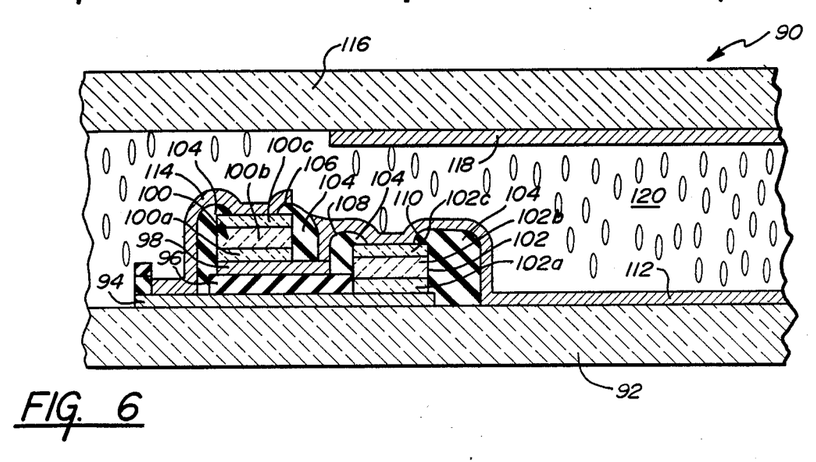
FIG. 6 is a cross-sectional side view of another liquid crystal display pixel.

Referring now to FIG. 6, it illustrates a further liquid crystal display pixel 90. The pixel 90 is formed on an insulative substrate 92, such as glass, for example. Formed on the glass substrate 92 is a first address lead 94. The address lead 94 can be formed from a conductive metal as in the previous embodiments and can be, for example, aluminum, molybdenum, or a molybdenum tantalum alloy. Other suitable metals are chromium, tantalum tungsten, palladium, and platinum. The address lead 94 can be formed by, for example, S-gun magnetron sputtering the metal over the entire surface area of the glass substrate 92 and then removing selected portions of the deposited metal by using a mask and photolithography techniques of the type well known in the art.

The pixel 90 further includes insulating layer 96 and portions 104. The insulating layer 96 and portions 104 can be formed from any deposited insulator such as silicon oxide or silicon nitride. During the photolithography step in forming the portions 104, openings 106, 108, and 110 can be formed therein to expose surface portions of the n-type regions of the diodes 100 and 102 and a surface portion of the interconnect lead 98.

The pixel 90 further includes a bottom electrode 112 and a second interconnect lead 114. The electrode 112 and second interconnect lead 114 can be formed from any of the metals previously referred to and by S-gun magnetron sputtering the metal over the entire surface area and thereafter removing selected portions thereof by conventional photolithography techniques. As will be noted from FIG. 6, the second interconnect lead 114 contacts the address lead 94 and the n-type region 100c of diode 100 through the opening 106 of the insulating portions 104. The electrode 112 contacts the first interconnect lead 98 through the opening 108 and the n-type region 102c of diode 102 through the opening 110. As a result, the anode of diode 102 is coupled to the cathode of diode 100 and the anode of diode 100 is coupled to the cathode of diode 102. Also, the joint connection between the anode of diode 100 and the cathode of diode 102 is coupled to the first or bottom electrode 112.

The pixel 90 further includes an insulative transparent plate 116 which has a transparent conductive material 118 deposited on its inner surface to form the second electrode of the pixel 90. The transparent conductor 118 is configured to have the same dimensions as the effective dimensions of the first electrode 112 and is aligned therewith. Disposed between at least the electrodes 112 and 18, and in contact therewith, is liquid crystal display material 120, which can be, for example, nematic liquid crystal material of the type well known in the art. The top transparent plate 116 as well as the lower plate 92 can be, as in the previous embodiments, polarized in a manner consistent with the type of liquid crystal display material 120 utilized in the display.

Figure 7:
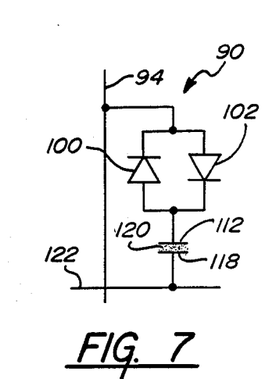
FIG. 7 is a schematic circuit diagram illustrating the equivalent circuit of the liquid crystal display pixel of FIG. 6.

Referring now to FIG. 7, it illustrates the equivalent schematic circuit diagram of the liquid crystal display pixel 90 of FIG. 6. As can be noted in FIG. 7, the pixel includes the pair of diodes 100 and 102 with the cathode of diode 100 and the anode of diode 102 coupled together and to the first address lead 94. The anode of diode 100 and the cathode of diode 102 are also coupled together and to the first electrode 112. The second electrode 118 is coupled to a second address lead 122 (not shown in FIG. 6) and the liquid crystal display material 120 is disposed between and in electrical contact with at least the electrodes 112 and 118.

Like the pixels of the previous embodiments, the potential applied to the liquid crystal material 120 can be reversed during alternate frames. During one frame, a positive potential can be applied to address lead 94 and a negative potential to address lead 122. During alternate frames, a positive potential can be applied to address lead 122, and a negative potential to address lead 94. In this manner, the potential applied to the liquid crystal material 120 can be reversed during alternate frames.

Figure 8:
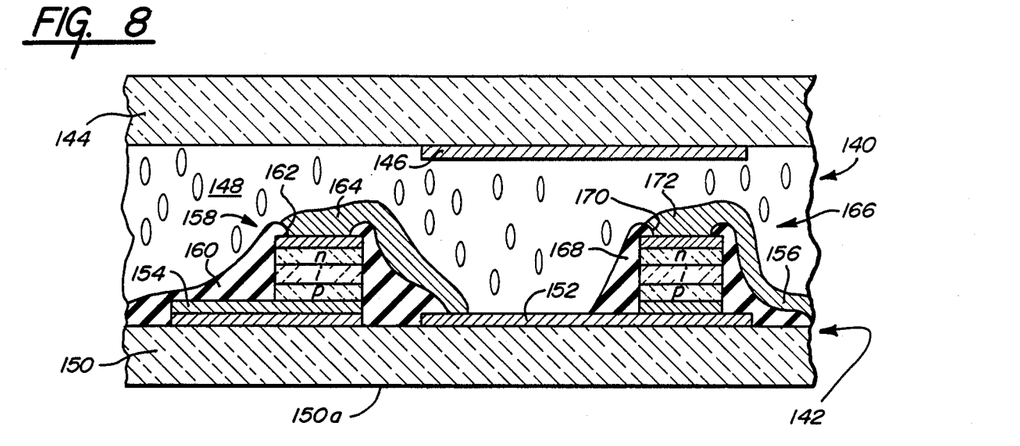
FIG. 8 is a cross-sectional side view of a liquid crystal display pixel embodying the present invention.

FIG. 8 illustrates an embodiment of the present invention. A single pixel 140 of a display which incorporates a subassembly 142 is illustrated in FIG. 8. Spaced apart from the subassembly 142 is an insulating transparent substrate 144 which can be formed of glass and upon which is formed a pixel electrode 146. The pixel electrode 146 may be formed of transparent indium tin oxide. Between the substrate 144, the electrode 146 and the subassembly 142 is a region 148 which is filled with a light influencing material. For example, nematic liquid crystal material of a conventional type may be used.

The subassembly 142 includes an insulating substrate, such as glass, 150 upon which is formed a pixel electrode 152. The subassembly 142 also includes a first address line 154 formed on the substrate 150 and a second address line 156 insulated from the first address line 154 and carried by the substrate 150. An isolation device 158, preferably a p-i-n diode, is formed on a region of the first address line 154. A silicon dioxide layer 160, or equivalent insulator as previously disclosed, surrounds the diode 158 and covers the address line 154 except in a region or via 162. A metal deposit 164 extends through the via 162 and is in contact with the isolation device 158. The deposit 164 couples the isolation device 158 to the electrode 152.

A second isolation device 166, also preferably a p-i-n diode, is formed on a region of the pixel electrode 152. An insulating layer 168, such as silicon dioxide, surrounds and covers the isolation device 166 except in a region or via 170. A metal deposit 172 extends through the via 170 to contact the isolation device 166. The second address line 156 is preferably formed during the same processing step and at the same time as the metal deposit 172. To simultaneously form the second address line 156 and metal deposit 172, a layer of metal can be deposited over the insulating layer 168. The metal layer is then etched away in a conventional fashion to form the deposit 172 and the address line 156. Alternately, the second address line could be formed before or after the metal deposit 172. The metal deposit 172 couples the isolation device 166 between the electrode 152 and the second address line 156. The second address line 156 is deposited on a region of the insulating layer 168. The equivalent circuit of FIG. 3 applies to the liquid crystal display 140 of FIG. 8.

The address lines 154, 156 are formed with no crossovers as were the address lines 6, 26. The address lines 154, 156 are each coupled to the electrode 152. The subassembly 142 has the same benefits as does the pixel 10 of FIG. 2 because of the noncrossing address lines.

Figure 9:
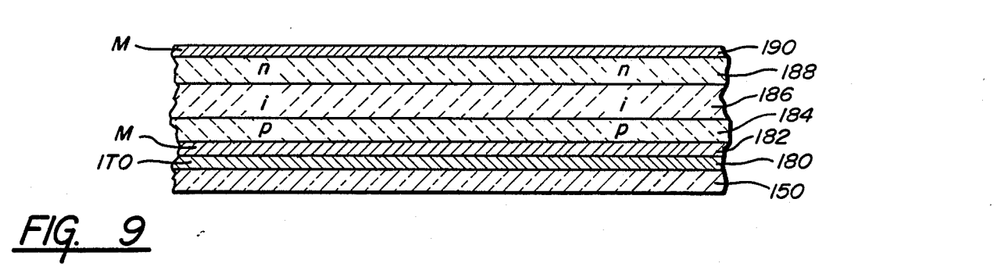
FIGS. 9–15 are cross-sectional side views illustrating the method of making the liquid crystal display pixel of FIG. 8 at various stages thereof in accordance with the present invention.

FIG. 9 illustrates a first step in practicing a method embodying the present invention. As illustrated in FIG. 9 on the substrate 150, is formed a multilayer, 180 through 190, structure. The layer 180 is a deposited layer of conductive indium tin oxide which is also transparent. The layer 182 is a deposited layer of conductive metal such as aluminum, molybdenum, or a molybdenum tantalum alloy. Alternately, chromium, tantalum, tungsten, palladium, or platinum may be used. The metal layer 182 is deposited as previously described. Overlying the layer 182 is a first doped semiconductor layer 184. The layer 184 is a deposited amorphous semiconductor layer including a p-type or n-type dopant formed as an amorphous silicon alloy previously described. The layer 186 overlying the layer 184 is an intrinsic layer of amorphous silicon alloy. The layer 188 overlying the layer 186 is a layer of doped amorphous silicon alloy which is opposite in conductivity as compared to the layer 184.

The layers 184 through 188 will ultimately be configured to form the isolation diodes 158 and 166. The layers 184–188 can be deposited by glow discharge deposition. As previously mentioned and as disclosed in the '898 Patent, one advantage of the present method is that the layers 184—188 can be deposited in a continuously maintained partial vacuum. The deposition process can include the glow discharge decomposition of at least silane gas. Hydrogen and/or fluorine can be mixed with the silane gas prior to the deposition. Alternately, silicon tetrafluoride can be used. Hydrogen can also be added to the silicon tetrafluoride prior to deposition. Overlying the doped layer 188 is another metal layer 190 of the type previously described.

Figure 10:
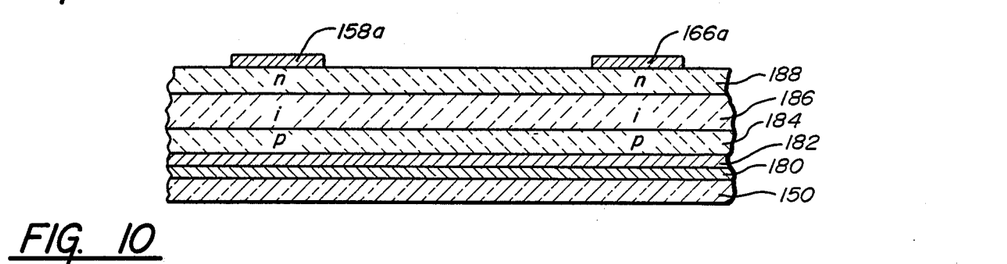

In the second step in practicing the method of the present invention, and as illustrated in FIG. 10, portions of the metal layer 190 are removed from the amorphous silicon alloy layer 188 by means of standard photolithographic techniques and etching except in selected regions 158a and 166a. The regions 158a and 166a may typically be on the order of 20 to 50 microns on a side.

One advantage of the method of the present invention lies in the fact that the metal regions 158a and 166a may now be used as masks for the purpose of selectively etching away the amorphous silicon alloy layers 184 through 188. Etching may be accomplished by means of a plasma etch incorporating sulfur hexafluoride ($SF_6$) or carbon tetrafluoride ($CF_4$), for example.

Figure 11:
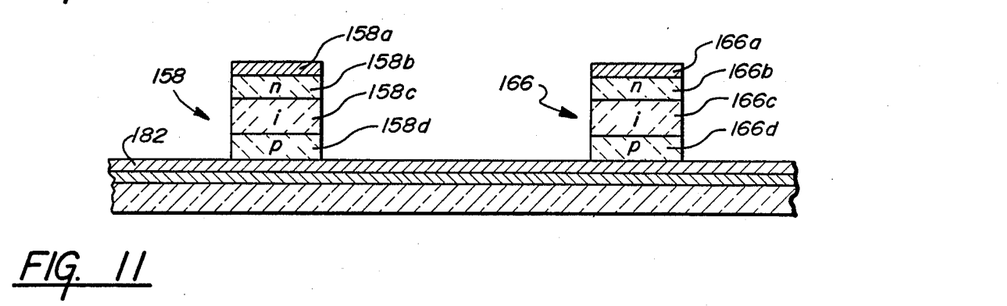

In the next step of the method of the present invention, as illustrated in FIG. 11, the metal regions 158a and 166a have formed masks such that the amorphous silicon alloy layers 184 through 188 have been etched away from the metal layer 182 everywhere except beneath the masks 158a and 166a. One of the remaining amorphous silicon alloy columns including n-doped region 158b intrinsic region 158c and p-doped region 58d forms a p-i-n diode which is the isolation device 158. Similarly, beneath the metal region 166a the n-doped amorphous silicon alloy region 166b the intrinsic region 166c and the oppositely doped amorphous silicon alloy region 166d form the isolation device 166.

A plasma etching process is disclosed in more detail in a U.S. patent application entitled "High Performance, Small Area Thin Film Transistor", Ser. No. 549,996, filed Nov. 8, 1983 and assigned to the assignee of the present invention. The disclosure of the '996 application is incorporated herein by reference.

Figure 12:
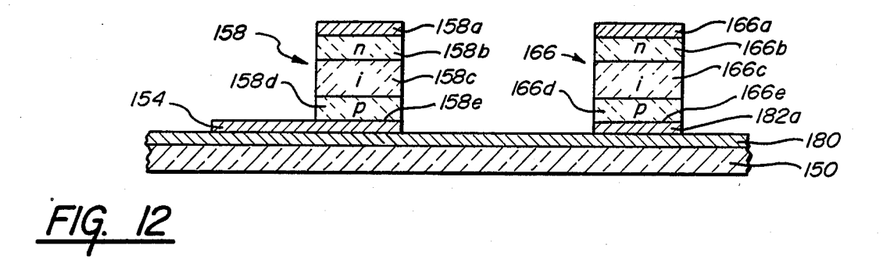

After the plasma etch has been used to form the isolation diodes 158 and 166 as shown in FIG. 11, the results of the next step of the method of the present invention are illustrated in FIG. 12. The metal layer 182 is etched away from the indium tin oxide layer 180 by means of conventional lithography and etching techniques so as to form the address line 154 and a metal pad 182a. As can be seen from FIG. 12 the isolation device 158 occupies a region 158e of the address line 154. The isolation device 166 forms a mask and is positioned on a surface 166e of the metal pad 182a.

Figures 13, 14:
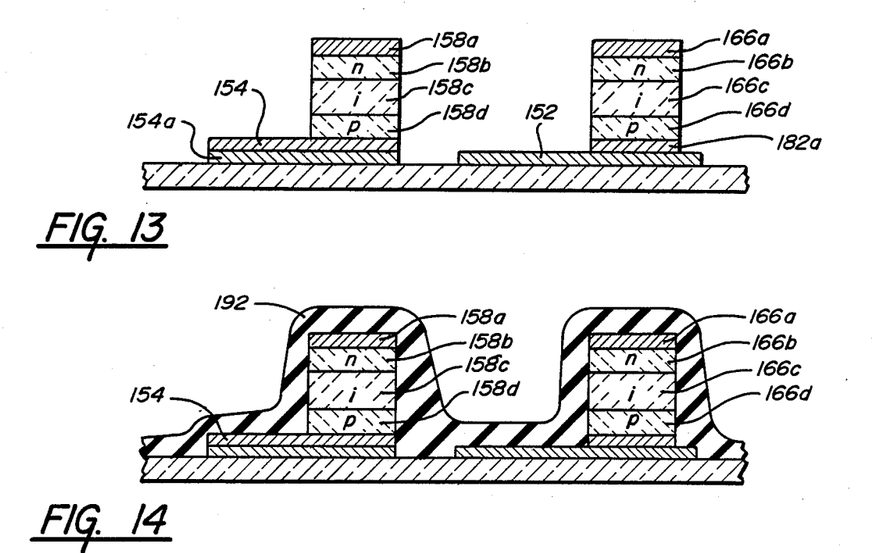

In the next step of the method of the present invention, as illustrated in FIG. 13, the indium tin oxide layer 180 is etched away so as to form the pixel electrode 152 and a lower region 154a of the address line 154.

Figure 15:
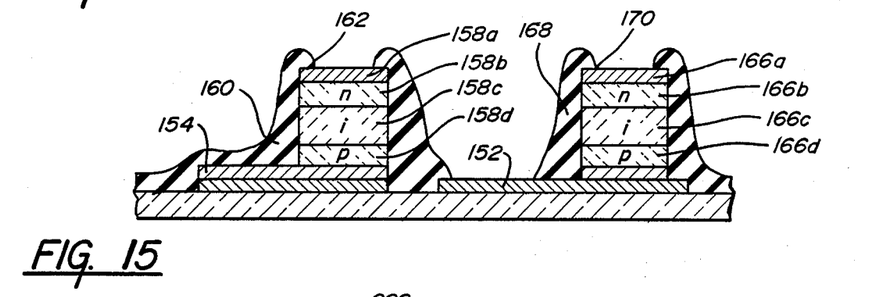
Figure 16:
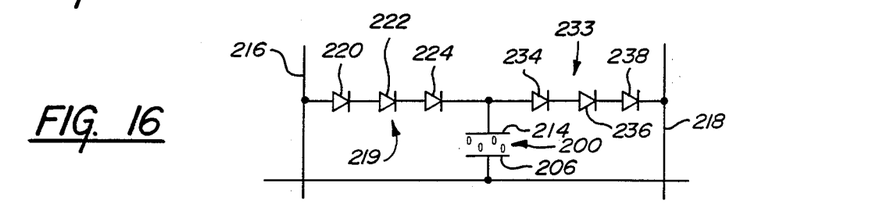
FIG. 16 is a cross-sectional side view of another liquid crystal display pixel embodying the present invention.

As illustrated in FIG. 14, the structure of FIG. 13 is next covered with a deposited insulator 192 such as silicon dioxide or silicon nitride or a polyimide as discussed previously. The insulating layer 192 can then be etched away, as illustrated in FIG. 15, in the next step of the method of the present invention so as to form the vias 162 and 170 as well as to expose the pixel electrode 152.

As can be seen in FIG. 8, the metal deposit 164 connecting the isolation device 158 to the pixel electrode 152, the metal deposit 172 and the second address line 156 are then formed. The deposits 164, 172 and the second address line 156 can be formed by depositing a metal layer over the entire structure including the pixel electrode 152 and the insulating regions 160 and 168. The metal layer can then be etched away so as to leave the deposits 164, 172 and the second address line 156. The result of applying the steps of the method of the present invention to the multilayer structure 180-190 is the subassembly 142. The subassembly 142 can then be combined with the substrate 144 to form the pixel 140.

The method of the present invention can be used in connection with a continuous process system of the type disclosed in U.S. Pat. No. 4,438,723, entitled "Multiple Chamber Deposition And Isolation System And Method," which issued Mar. 27, 1984. The method of the present invention can also be used with batch systems of the load-lock type. The method of the present invention can be used to form transmissive or reflective displays. For a reflective display, a mirror can be located adjacent an external surface 150a of the substrate 150 as indicated in FIG. 8. Alternately, the electrode 152 can be formed with a part of the metal layer 182 thereon. For a transmissive display, the subassembly 142 can be formed as shown in FIG. 8.

FIG. 18 illustrates a circuit of the pixel 200. The address lines 216 and 218 are illustrated in FIG. 18 connected to the electrode 214 through the series coupled first isolation devices 219, such as diodes 220 through 224 and 234 through 238. By selecting the number of series connected diodes, the magnitude of the reverse bias voltage that can be applied across the diodes such as 220-224 can be increased.

An advantage of the present method can be improved manufacturing yields. Since the vertically arranged isolation diodes are series connected, a short in any one of them will not render the pixel inoperable due to the existence of remaining series coupled, operative isolation diodes.

As can be appreciated by those skilled in the art, the present invention can be practiced otherwise as specifically disclosed herein. For example, doping of the diodes can be reversed and the diodes of the displays can be formed from deposited semiconductor materials other than amorphous semiconductor alloys. Alternately, the diodes can be formed from polycrystalline semiconductor alloys. Furthermore the amorphous semiconductor alloy material diodes can be formed from other material configurations than the p-i-n configuration described herein. For example, configurations such as p-$\pi$-n, p-$\nu$-n, p-n, etc are possible where $\pi$ and $\nu$ refer to lightly doped p and n-type semiconductor material respectively.

We claim:

1. A method of making a display of the type including at least one pixel including at least one pair of isolation devices, said method comprising the steps of:

(A) providing an insulative substrate having a conductive layer thereover;

(B) depositing a first metal layer over said conductive layer;

(C) depositing a first doped semiconductor layer over said first metal layer;

(D) depositing a substantially intrinsic semiconductor layer over said first doped layer;

(E) depositing a second doped semiconductor layer over said intrinsic layer, said second doped layer being opposite in conductivity with respect to said first doped layer;

(F) depositing a second metal layer over said second doped semiconductor layer;

(G) removing portions of said second metal layer for providing discrete portions of said second metal layer to define the location of said isolation devices;

(H) removing portions of said semiconductor layers while using at least said second metal discrete portions as a mask to form said isolation devices;

(I) removing portions of said first metal layer to form a first address lead with at least one of said isolation devices electrically connected thereto;

(J) removing portions of said conductive layer to form a first pixel electrode with the other of said isolation devices electrically connected thereto;

(K) forming an interconnect lead to electrically couple said at least one isolation device on the side thereof opposite said first address lead to said first pixel electrode;

(L) forming a second address lead insulated from said first address lead and electrically coupled to said at least one other isolation device on the side thereof opposite said first pixel electrode;

(M) forming a second pixel electrode spaced from and substantially parallel to said first pixel electrode; and (N) applying light influencing material between said pixel electrodes.

2. A method as defined in claim 1, wherein the conductive layer provided in step (A) is transparent.

3. A method as defined in claim 1, wherein step (M) is performed by forming a transparent second pixel electrode.

4. A method as defined in claim 1, wherein steps (C), (D), and (E) are performed in succession in a partial vacuum and wherein said partial vacuum is continuously maintained during the performance of steps, (C), (D), and (E).

5. A method as defined in claim 4, wherein said semiconductor layers are deposited by glow discharge deposition.

6. A method as defined in claim 5, wherein a fluorine containing gas is introduced into the glow discharge.

7. A method as defined in claim 1, wherein step (H) includes removing said portions of said semiconductor layers in one continuous process.

8. A method as defined in claim 7, wherein step (H) includes plasma etching.

9. A method as defined in claim 1, wherein after step (E) are performed the steps of:
   (E1) depositing at least a first additional doped semiconductor layer over said second doped layer, said first additional doped layer being opposite in conductivity with respect to said second doped layer;
   (E2) depositing at least an additional substantially intrinsic semiconductor layer over said first additional doped layer;
   (E3) depositing at least a second additional doped semiconductor layer over said additional intrinsic layer, said second additional doped layer being opposite in conductivity with respect to said first additional doped layer; and
   wherein step (F) includes depositing said second metal layer over said second additional doped semiconductor layer.

10. A method as defined in claim 1, wherein step (N) includes applying liquid crystal display material between said pixel electrodes.

11. A method as defined in claim 1, wherein said first and second address leads do not intersect.

12. A method as defined in claim 1, wherein the conductive layer of step (A) is patterned prior to depositing the first metal layer of step (B).

13. A method of making a subassembly for use in a display of the type including at least one pair of isolation devices and light influencing material, said method comprising the steps of:
   (A) providing an insulative substrate having a conductive layer thereover;
   (B) depositing a first metal layer over said conductive layer;
   (C) depositing a first doped semiconductor layer over said first metal layer;
   (D) depositing a second doped semiconductor layer over said intrinsic layer, said second doped layer being opposite in conductivity with respect to said first doped layer;
   (E) depositing a substantially intrinsic semiconductor layer over said first doped layer;
   (F) depositing a second metal layer over said second doped semiconductor layer;
   (G) removing portions of said second metal layer for providing discrete portions of said second metal layer to define the location of said isolation devices;
   (H) removing portions of said semiconductor layers while using at least said second metal discrete portions as a mask to form said isolation devices;
   (I) removing regions of said first metal layer to form a first address lead with one of said isolation devices electrically connected thereto;
   (J) removing portions of said conductive layer to form a first pixel electrode with the other of said isolation devices electrically connected thereto;
   (K) forming an interconnect lead to electrically couple said at least one isolation device on the side thereof opposite said first address lead to said pixel electrode; and
   (L) forming a second address lead insulated from said first address lead and electrically coupled to said other isolation device on the side thereof opposite said pixel electrode.

14. A method as defined in claim 13, wherein step (A) is performed by depositing a transparent conductive layer over said substrate.

15. A method as defined in claim 13, wherein steps (C), (D), and (E) are performed in succession in a partial vacuum and wherein said partial vacuum is continuously maintained during the performance of steps (C), (D), and (E).

16. A method as defined in claim 15, wherein said semiconductor layers are deposited by glow discharge deposition.

17. A method as defined in claim 13, wherein step (H) includes removing said portions of said semiconductor layers in one continuous process.

18. A method as defined in claim 17, wherein step (H) includes plasma etching.

19. A method as defined in claim 13, wherein after step (E) are performed the steps of:
   (E1) depositing at least a first additional doped semiconductor layer over said second doped layer, said first additional doped layer being opposite in conductivity with respect to said second doped layer;
   (E2) depositing at least an additional substantially intrinsic semiconductor layer over said first additional doped layer;
   (E3) depositing at least a second additional doped semiconductor layer over said additional intrinsic layer, said second additional doped layer being opposite in conductivity with respect to said first additional doped layer; and
   wherein step (F) includes depositing said second metal layer over said second additional doped semiconductor layer.

* * * * *